Figure 1A:
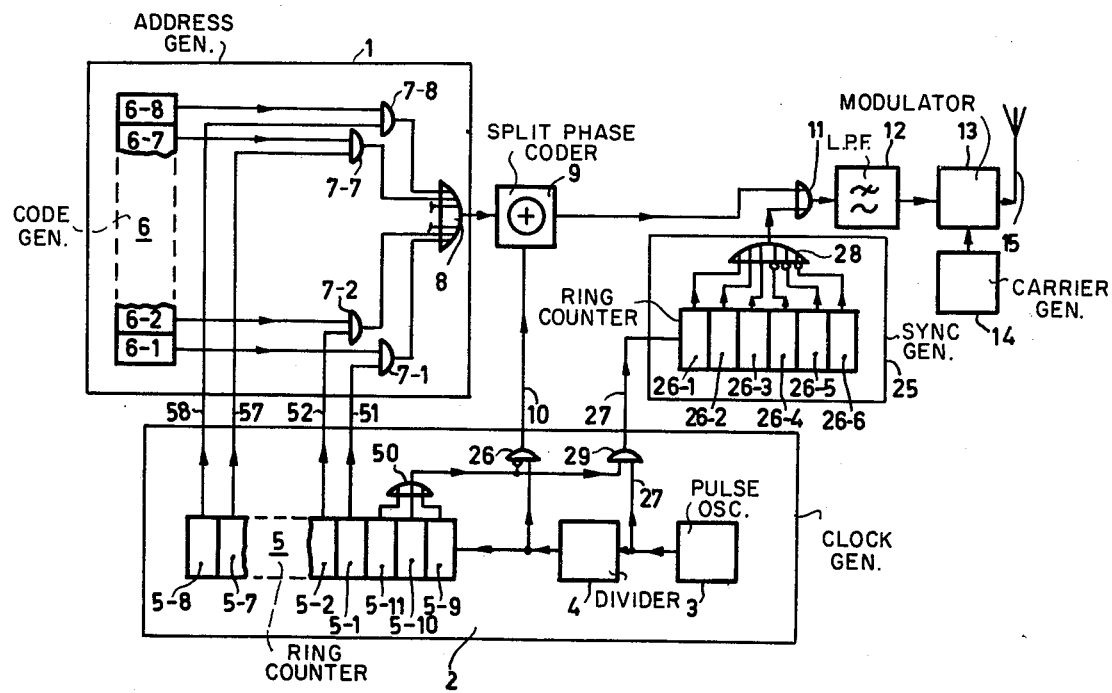

United States Patent [19]
Morrien

[11] 3,980,825
[45] Sept. 14, 1976

[54] SYSTEM FOR THE TRANSMISSION OF SPLIT-PHASE MANCHESTER CODED BIVALENT INFORMATION SIGNALS

[75] Inventor: Albertus Marinus Morrien, Hilversum, Netherlands

[73] Assignee: U.S. Philips Corporation, New York, N.Y.

[22] Filed: Jan. 10, 1974

[21] Appl. No.: 432,281

[30] Foreign Application Priority Data
Feb. 12, 1973 Netherlands .................... 7301930

[52] U.S. Cl. .................................. 178/67; 325/30
[51] Int. Cl.² .................................... H04L 27/18
[58] Field of Search ......... 178/66 R, 67, 68, 69.5 R; 325/30, 38 R; 328/155; 179/15 BS

[56] References Cited
UNITED STATES PATENTS

| | | |
|---|---|---|
| 3,317,669 | 5/1967 | Ohnsorge .................... 178/69.5 R |
| 3,401,339 | 9/1968 | Kluever et al. .................... 178/67 X |
| 3,591,720 | 7/1971 | Othmer .......................... 178/69.5 R |
| 3,679,977 | 7/1972 | Howson ............................... 325/42 |
| 3,699,261 | 10/1972 | Tomozawa ...................... 179/15 BS |
| 3,730,994 | 5/1973 | Terry et al. .................... 178/69.5 R |
| 3,766,316 | 10/1973 | Hoffman et al. ............... 178/69.5 R |
| 3,789,303 | 1/1974 | Hoffman et al. ...................... 178/67 |

Primary Examiner—Benedict V. Safourek
Attorney, Agent, or Firm—Frank R. Trifari; Henry I. Steckler

[57] ABSTRACT

A system for transmitting split-phase Manchester coded information signals, in which a synchronization signal is used to enable phase-synchronous detection on the receiver side of the split-phase coded information signals. This synchronization signal has a first signal level for at least three successive half bit times of the information signal, and a second signal level for at least three successive half bit times of the information signal.

4 Claims, 4 Drawing Figures

SYSTEM FOR THE TRANSMISSION OF SPLIT-PHASE MANCHESTER CODED BIVALENT INFORMATION SIGNALS

The invention relates to a system for transmitting splitphase Manchester coded bivalent information signals, in which a synchronisation signal is transmitted which directly preceeds a group of information signals.

A system of this kind which is used for the transmission of messages is known inter alia from U.S. Pat. 2,939,914.

Split-phase Manchester coded bivalent information signals have signal transitions from a first level to a second level or vice versa which can occur not only at the beginning of the bivalent information signals, but also halfway between these bits. This implies that on the receive side of a transmission system of this kind a 180° phase uncertainty arises when bivalent information signals are recovered from received signals.

In order to eliminate this phase uncertainty, it is known from said United States Patent Specification to utilize a synchronisation signal which is composed of a split-phase Manchester coded series of identical signals. These identical signals have one of the two possible signal values of which the bivalent signals are composed. The phase of these predetermined signals is unambiguously determined on the receive side and this phase information is used for decoding the subsequently transmitted split-phase Manchester coded bivalent information signals, A drawback is encountered in that this synchronisation signal cannot be distinguished from the information signals, with the result that separate steps must be taken for the recognition of the synchronisation signal such as, for example, the transmission of the synchronisation signal once before all information signals to be transmitted.

The invention has for its object to realise a very simple synchronisation signal in a system of the kind set forth which mitigates the said drawback and which approximates the properties of split-phase Manchester coded signals as much as possible.

The system according to the invention is characterized in that the synchronisation signal has a first signal level for a period of time which corresponds to at least three half bit times of the information signals and has a second signal level, different from the first signal level, for an immediately subsequent period of time which also corresponds to at least three half bit times.

It is to be noted that the use of a synchronisation signal which deviates from a coding rule of information signals to be transmitted is known per se from British Pat. 986,280. However, therein bipolar coded signals are concerned. Moreover, the synchronisation signals described therein introduce a direct voltage component in the transmission signal; this component is liable to vary very slowly and can have a comparatively high value for the transmission of very short messages.

The invention and its advantages will be described in detail hereinafter with reference to the figures.

Figure 1B:
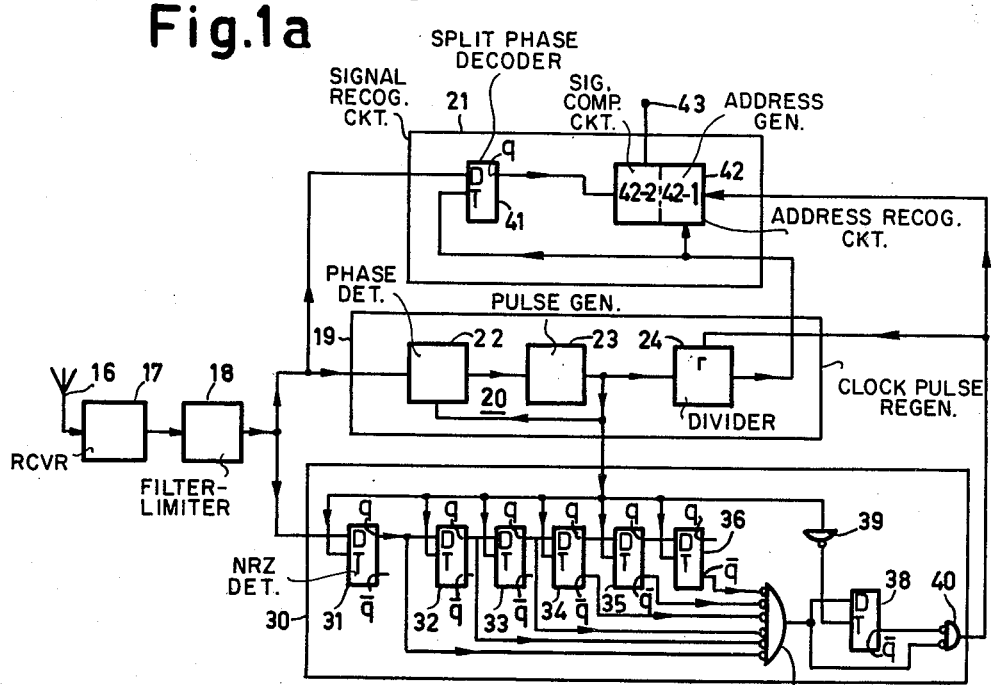
Figure 2:
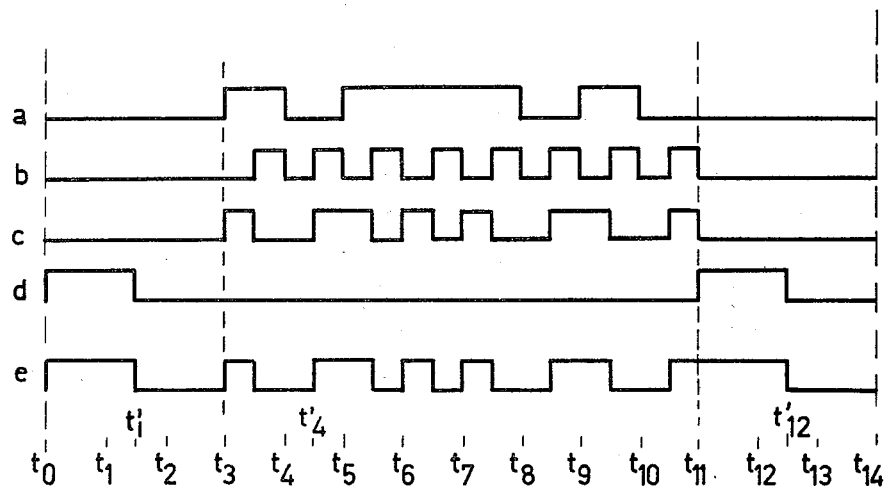
Figure 3:
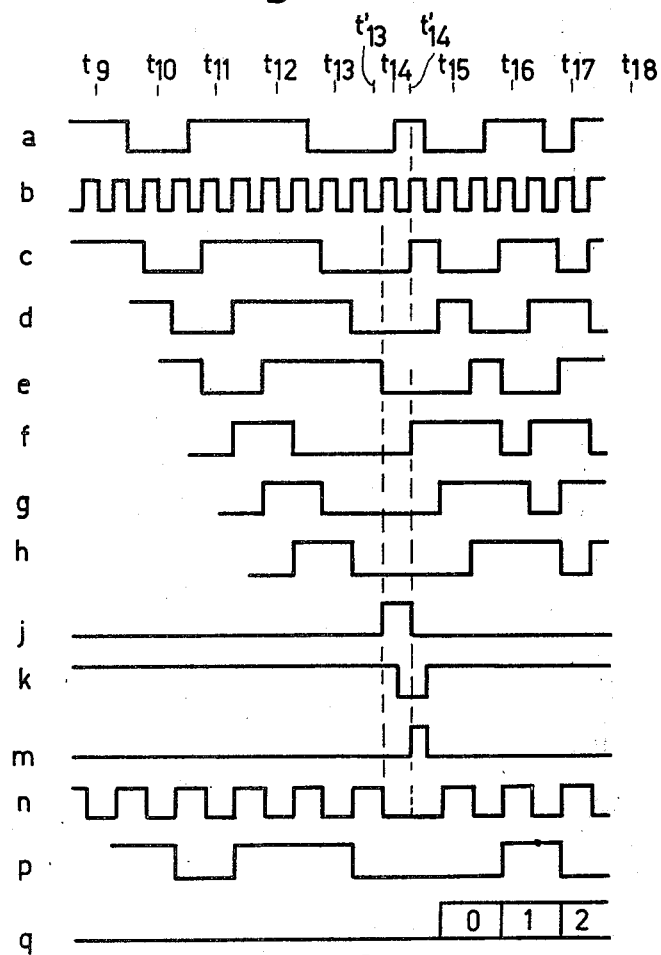

FIG. 1a shows an embodiment of a transmitter of a transmission system according to the invention, FIG. 2 shows a few signals which can appear in the transmitter shown in FIG. 1a, FIG. 1b shows an embodiment of a receiver of a transmission system according to the invention, FIG. 3 shows a few signals which can appear in the embodiment shown in FIG. 1b.

The system for the transmission of split-phase Manchester coded signals which is shown in FIGS. 1a and 1b is composed of a transmitter as shown in FIG. 1a and a receiver as shown in FIG. 1b. A system of this kind is used, for example, as a person paging system in which a very large number of receivers are used. These receivers can be individually called by means of addresses assigned thereto. An address is formed by a bivalent logic signal which will be referred to hereinafter as information signal. In order to generate these information signals., the transmitter comprises an address generator 1 which comprises a known code generator 6 which is composed of eight sections 6-1 to 6-8 in this embodiment. Using this code generator 6, any desired information signal can be generated in parallel form. The address generator 1 is furthermore provided with a parallel/series converter which is formed by the AND-gates 7-1 to 7-8 and the OR-gate 8 connected thereto, the outputs of the sections 6-1 to 6-8 of the code generator 6 being connected to first inputs of the AND-gates 7-1 to 7-8. A clock pulse generator 2 is provided in order to enable the time-sequential supply of the information signals to the AND-gates. This clock pulse generator 2 comprises a pulse oscillator 3, a two-divider 4 which divides the pulse series supplied by the pulse oscillator 3 by 2, and a ring counter 5 which receives the pulse series supplied by the two-divider 4, to be referred to hereinafter as clock-pulse series. This ring counter 5 comprises a number of sections 5-1 to 5-8 which corresponds to the number of bits of the information signals and in which a logic 1-signal is circulated under the control of the clock pulses. The sections 5-1 to 5-8 are connected, via the conductors 51 to 58, to second inputs of the AND-gates 7-1 to 7-8. It is thus achieved that OR-gate 8 supplies a signal, the bits of which coincide with the clock pulses, the signal values of the bits being determined by the values of the information signals supplied by the sections 6-1 to 6-8. A signal of this kind is shown between the instants $t_3$ and $t_{11}$ in FIG. 2a.

This signal is applied, together with the clock pulses supplied by the two-divider 4 and shown between the instants $t_3$ and $t_{11}$ in FIG. 2b, to a split-phase coding unit 9 which is constructed as a modulo-two adder. The split-phase Manchester coded bivalent information signal which is supplied by the coding unit 9 and which is shown in FIG. 2c between the instants $t_3$ and $t_{11}$, is applied to a frequency modulator 13, via an OR-gate 11 and a low-pass filter 12, the said modulator also receiving a carrier which is generated by a carrier generator 14. The frequency modulated carrier signal which is supplied by the modulator 13 is transmitted, by way of aerial 15, to aerial 16 of the receiver shown in FIG. 1b.

The frequency modulated carrier signal received by the aerial 16 is applied to an FM receiver 17 which converts the signal to an intermediate frequency, amplifies the signal and demodulates the signal. The demodulated signal is subsequently applied to a filter/limiter 18 which on the one side suppresses the interference situated outside the signal band and which on the other side adapts the wave form to the digital wave form required for the further equipment. A signal supplied by the unit 18 is shown in FIG. 3a, the wave form corresponding at the indicated instants to the wave form shown at the same instants in FIG. 2c. The signal supplied by unit 18 is applied on the one side to a clock pulse regenerator 19 and on the other side to a signal recognition unit 21.

The clock pulse regenerator comprises a pulse generator 23 which is incorporated in a phase loop 20, together with a phase detector 22. By means of this phase loop 20 the instants of appearance of the pulses of a pulse series generated by the generator 23 are made to coincide with the zero passages appearing in the split-phase coded signal. As appears from the FIGS. 2a and 2c, zero passages occur in a split-phase coded signal at the beginning of bits of the information signals, for example, at the instants $t_6$ and $t_7$, as well as halfway between the bits, for example, at the instant $t'_4$. In order to ensure that a pulse supplied by the generator 23 appears at the instant of each zero passage of the signal shown in FIG. 3a, the pulse repetition frequency of the pulse series shown in FIG. 3b is twice as high as the bit frequency of the information signal. This pulse series is applied to a two-divider 24 which supplies a regenerated clock signal. Using this clock signal, applied to the signal recognition unit, the split-phase Manchester coded signal is decoded in a decoder 41 and is applied to an address recognition unit 42 for further processing.

As has already been explained, the regenerated clock signal is derived by division from a pulse series having a pulse repetition frequency which is twice as high as the bit frequency of the information signals. As a result, the regenerated clock signal has a phase which is shifted 0° or 180° with respect to the bits of the information signal. So as to eliminate these two possible phase positions of the regenerated clock signal, the information signals are preceded by a synchronisation signal by means of which the phase of the regenerated clock signal can be unambiguously determined.

A synchronisation signal which is very suitable for this purpose according to the invention, has a first signal level (1) for a period of time ($t_0 - t'_1$; FIG. 2d) which corresponds to at least three successive half bit times of the information signal, and a second signal level (0), different from the first level, for a subsequent period of time ($t'_1 - t_3$) which also corresponds to at least three successive half bit times of the information signal.

In order to generate this synchronisation signal, the transmitter is provided with a synchronisation signal generator 25. This generator comprises a ring counter which is composed of six sections 26-1 to 26-6. The first three sections 26-1, 26-2 and 26-3 are connected to signal inputs of an OR-gate 28, whilst the remaining three sections 26-4, 26-5 and 26-6 are connected to signal-inverting inputs of this OR-gate. The pulses supplied by the pulse oscillator 3 are applied as shift pulses to the sections of the ring-counter via the conductor 27. Under the control of six successive shift pulses a logic 1-signal is circulated once in the ring counter, with the result that the OR-gate 28 supplies a high signal during three successive shift pulses and a low signal during the three subsequent shift pulses. The pulse repetition frequency of the shift pulses supplied by the pulse oscillator 3 is twice as high as the frequency of the clock pulses derived therefrom by two-division, with the result that the bit times of the synchronisation signal (see FIG. 2d between the instants $t_0 - t_3$) amount to one half of those of the information signal (FIG. 2a).

This synchronisation signal differs from a split-phase Manchester coded information signal in that no signal level changes occur during two successive periods of time of at least three half bit times of the information signal each.

Because this synchronisation signal requires a duration of only three bit times, optimum transmission time is available for the transmission of information signals.

The transmission of bivalent information signals by means of split-phase modulation is used inter alia because of the fact that split-phase coded signals do not contain a direct current component. The synchronisation signal according to the invention does not contain a direct current component either, with the result that it is particularly suitable for use in a system employing split-phase coded signals.

In addition, the synchronisation signal contains only a single signal level change. This level change has a fixed location in the synchronisation signal. The instant of appearance of the synchronisation signal can thus be exactly determined on the receive side. In the transmitter it is ensured that a fixed phase relationship exists between the synchronisation signal and the clock pulse signal, so that the phase of the generated clock pulses is thus unambiguously determined upon detection of the synchronisation signal in the receiver. Because the appearance of the synchronisation signal can be exactly determined and because the length of this signal is known, this signal can also be used for the synchronisation of the information signal transmission which is grouped addresswise and which immediately follows each synchronisation signal. To this end, the synchronisation signal must be inserted between the address-wise grouped information signals at clock pulse instants.

For generating these address-wise grouped information signals with the intervals which are required for the synchronisation signals to be inserted and which coincide with clock pulse instants, the ring-counter 5 comprises the sections 5-9, 5-10, and 5-11, the clock pulses supplied by the two-divider 4 being applied, via and AND-gate 26, to the modulo-two counter 9, the outputs of the sections 5-9, 5-10 and 5-11 being connected, via an OR-gate 50, to an inverting signal input of the AND-gate 26.

After the logic 1-signal which has been shifted through the ring counter 5 has set the section 5-8 by a clock pulse, the sections 5-9, 5-10 and 5-11 are successively set under the control of the three subsequent clock pulses. The OR-gate 50 applies a logic 1-signal during this time to the signal-inverting input of the AND-gate 26, with the result that this AND-gate applies a logic 0-signal to the modulo-two counter (FIG. 2b; $t_0 - t_3$ and $t_{11} - t_{14}$). During this time, the sections 5-1 to 5-8 apply logic 0-signals to the AND-gates 7-1 to 7-8, with the result that the OR-gate 8 also applies a logic 0-signal to the modulo-two counter 9 (FIG. 2a; $t_0 - t_3$ and $t_{11} - t_{14}$).

Consequently, during this time the modulo-two counter 9 also supplies a logic 0-signal (FIG. 2c; $t_0 - t_3$ and $t_{11} - t_{12}$) which is applied to the OR-gate 11 which acts as a signal-insertion unit.

In order to generate the synchronisation signals during the intervals in the information signals, an AND-gate 29 is incorporated in the conductor 27 which receives the signals supplied by the OR-gate 50. As explained above, OR-gate 50 supplies a logic 1-signal only for the period of three clock-pulses during which no information signals are generated. Consequently, the AND-gate 29 allows passage of shift pulses (6 each time) for the synchronisation signal generator 25 only during this time.

Assuming that a section 26-6 of the ring counter is in the rest state, the synchronisation signal generator 25 applies the signal shown in FIG. 2d to the OR-gate 11 during the correct time intervals $t_0 - t_3$ and $t_{11} - t_{14}$.

The OR-gate 11 combines the signals applied thereto so as to form the signal which is shown in FIG. 2E and which is transmitted in the described manner to the receiver where this signal (FIG. 3a) is supplied by the filter/limiter 18.

In order to detect the synchronisation signal, the receiver is provided with a synchronisation signal detector 30. This detector 30 comprises an NRZ-detector 31 which is constructed as a bistable element 31, and a shift register which is composed of the cascade-connected bistable elements 32 to 36. the pulse series generated by the pulse generator (FIG. 2b) is applied to the trigger inputs T of the elements 31 to 36, whilst the split-phase coded signal shown in FIG. 3a is applied to the signal input D. The NRZ-detector 31 ensures that the signal transitions in the split-phase coded signal coincide with the leading edges of the pulse signal of FIG. 3b which occur at fixed instants.

The signal outputs Q of the elements 31, 32 and 33 and the inverted signal outputs Q of the elements 34, 35 and 36 are connected to inverted signal inputs of an AND-gate 37. Under the control of the pulses applied to the trigger inputs T, the signal supplied by elements 31 is shifted forwards. The signals applied to the AND-gate 37 by the outputs Q and Q, originating from the elements 31 to 36, are successively shown in the FIGS. 3c to 3h.

Due to the special wave form of the synchronisation signals which is distinct from that of the split-phase coded signals, all signals applied to the AND-gate 37 during a pulse period of the pulse series shown in FIG. 3b have the logic value 0 upong the appearance of a synchronisation signal, the said signals being shown during the time interval $t'_{13} - 14'_{14}$ in the FIGS. 3c to 3g. During this period the AND-gate 37 supplies the pulse signal which is shown in FIG. 3j and which has the logic value 1. It is to be noted that the NRZ-detector has shifted the pulse series over one half period of the signal shown in FIG. 2b. Consequently, the trailing edge of the signal shown in FIG. 3j does not appear at the instant $t_{14}$, marking the end of the synchronisation signal (FIG. 2a), but at the instant $t'_{14}$ which is shifted over one quarter bit length of the information signal with respect to the instant $t_{14}$. The purpose of this shift will be discussed in detail hereinafter.

The instant of appearance of the pulse shown in FIG. 3b, determined by the instant of appearance of the synchronisation signal, coincides with a given phase of clock pulses due to the fixed phase relationship between the appearance of the synchronisation signal and the clock pulse series. Because on the transmission side the end of the synchronisation signal coincides with a trailing edge of a clock pulse (instant $t_3$, FIGS. 2e and 2b), and because the trailing edge of the pulse signal shown in FIG. 3j coincides, save for the said one quarter bit length, with the end of the synchronisation signal (3a), the trailing edge of a regenerated clock signal must coincide with the instant of appearance of this trailing edge.

The pulse shown in FIG. 3j is first applied to the signal input D of a bistable element 38, the trigger input T of which receives, via an inverter 39, the pulse series supplied by the pulse generator 23, with the result that the signal shown in FIG. 3k is supplied by the inverted signal ouput Q of element 39. The signals shown in the FIGS. 3j and 3k are applied to signal-inverting inputs of an AND-gate 40 which supplies the synchronisation pulse shown in FIG. 3m. The leading edge of this pulse coincides with the trailing edge of the pulse shown in FIG. 3j, and hence with the trailing edge of the clock pulses. This synchronisation pulse is applied to the reset input r of the two-divider 24 in order to reset this two-divider upon the appearance of the leading edge of the synchronisation pulse if the two-divider were set.

FIG. 3n shows the regenerated clock pulse series supplied by the two-divider 24, it being assumed that the phase of this clock pulse series was not correct until the instant $t_{14}$ and that this phase is corrected by the synchronisation pulse at the instant $t'_{14}$.

This regenerated clock pulse series is applied to the trigger input T of the split-phase decoder which is constructed as a bistable element 41, the split-phase coded bivalent information signal shown in FIG. 2a being applied to a signal input D of the said element. As already described, the trailing edge of the pulse shown in FIG. 3j appears at the instant $t'_{14}$, with the result that the regenerated clock pulse series which is unambiguously determined by this pulse is phase-shifted 90° with respect to the coded split-phase signal of FIG. 2a. It is thus achieved that the bistable element 41 is set or reset, respectively, by the signal values appearing halfway the first bit halves of the split-phase coded signals, so if it may be expected that, in spite of any signal distortion occurring, the signal values which are characteristic of the transmission are present.

The bivalent information signal which is supplied by the decoder 41 is shown in FIG. 3p; it is to be noted that the signals appearing before the instant $t'_{14}$ do not represent real information because the regenerated clock signal is in phase-opposition with the desired clock signal. For the sake of clarity, FIG. 3q shows the bits, numbered 0, 1, 2 etc., of the information signal appearing after the synchronisation signal.

The signals supplied by the split-phase decoder 41 are applied to the address recognition unit 42 which is composed in known manner of an address generator 42-1 for generating the address signal which is specific of the receiver, and a signal-comparison unit 42-2 for comparing the information signal and the generated address signal. In order to apply the address signal in synchronism with the information signal to the signal comparison unit 42-2, the synchronisation pulse supplied by the AND-gate 40 is applied to the address generator 42-1 in order to start this generator 42-1 at the correct instant, and the regenerated clock-signal supplied by the two-divider 24 is also applied to this address generator 42-1 in order to make the bits of the address signal coincide with those of the information signal. If the address signal and the information signal correspond, the signal comparison unit 42-2 supplies a logic 1-signal on terminal 43.

What is claimed is:

1. A transmitter comprising means for transmitting split-phase Manchester coded bivalent information signals, and means for generating and adding a synchronisation signal to said transmitted information signal which directly preceeds a series of these information signals, the synchronisation signal having a first signal level for a period of time which corresponds to at least three successive half bit times of the information signals and a second signal level, different from the first signal level, for a subsequent period of time which also corresponds to at least three half bit times of the information signals.

2. A transmitter as claimed in claim 1, the said transmitting means comprising an information signal generator, a split-phase coder coupled to said information signal generator and a carrier modulator coupled to said coder, the synchronisation signal generator and adding means comprising a ring counter having at least six sections, an OR gate having a plurality of inverting and noninverting inputs which are inverse with respect to each other, the signal outputs of the first half number of sections and the signal outputs of the remaining sections being coupled to said signal inputs of said OR-gate which are inverse to each other, a pulse signal generator means coupled to the ring counter for applying a pulse series having a pulse repetition frequency which amounts to twice the bit frequency of the information signals to the ring counter in order to shift logic signal level through the ring counter under the control of this pulse series, a signal insertion unit coupled between the split-phase signal coder and the carrier modulator, the OR-gate being coupled to this signal insertion unit in order to insert the synchronisation signal between information signals.

3. A receiver for receiving split-phase Manchester coded bivalent information signals, in which a synchronisation signal is received which directly preceeds a series of these information signals, the synchronisation signal having a first signal level for a period of time which corresponds to at least three successive half bit times of the information signals and has a second signal level, different from the first signal level, for a subsequent period of time which also corresponds to at least three half bit times of the information signals, the said receiver comprising a carrier demodulator means for receiving said information and synchronisation signals, a clock pulse regenerator unit, a split-phase decoder unit, and a synchronisation signal detector unit, the said units each having an input parallel coupled to said carrier demodulator, the clock pulse regenerator comprising a pulse oscillator means for deriving from the signal transitions of the split-phase coded signal a pulse series having a pulse repetition frequency which amounts to twice the bit frequency of the split-phase coded information signal, a two-divider provided with a control input being coupled to said pulse oscillator, said two-divider being coupled to the split-phase decoder for decoding the split-phase coded information signals applied thereto, the synchronisation signal detector unit having an output means coupled to the control input of the two-divider for making the two-divider supply clock pulses which are phase-synchronous with the bits of the split-phase coded signals, the synchronisation signal detector unit comprising a shift register having at least six sections, trigger inputs thereof receiving the pulse signal generated by the pulse oscillator, and AND gate having a plurality of inputs, the output of each section being coupled to an input of said AND-gate circuit respectively, said AND gate having an output means coupled to said synchronisation signal detector unit output means for applying a synchronisation signal to said control input if the signal contents of the first half of the number of sections of the shift register are the same and the signal contents of the remaining sections are inverse thereto.

4. A receiver as claimed in claim 3, further comprising an address recognition unit having an address-signal generator and a signal comparison unit coupled thereto, said comparison unit having an output means for providing an alert signal, the split-phase decoder being coupled to said recognition unit for comparing the signals applied thereto, the synchronisation signal detector unit output means being coupled to the address generator to make the synchronisation pulse supplied by the detector start the address signal generator.

* * * * *